Patented Feb. 8, 1938

2,107,637

UNITED STATES PATENT OFFICE 2,107,637

METHOD OF MAKING POROUS ARTICLES

Pierre Lefebvre-Carnot, Paris, and Leon Pierre Georges Vautier, St. Just des Marais, France, assignors to Société Francaise de la Viscose S. A., a corporation of France No Drawing. Application August 11, 1936, Serial No. 95,446. In Great Britain August 24, 1935

9 Claims. (Cl. 18—48)

This invention relates to the manufacture of porous objects of cellulosic material. More particularly, this invention relates to the production of artificial sponges.

Prior to the instant invention, artificial sponges and similar porous artificial products were made by processes which comprised molding an intimate mixture of a cellulosic solution, crystalline substances and fibers, coagulating the molded mass, extracting the crystalline substances by dissolving them from the mass, and finishing the porous product by suitable treatments. The surface of articles thus produced was more compact than the interior, since the crystals which gave rise to the formation of pores were forced inwardly toward the interior during the molding operation and, therefore, could not perform the pore-forming function on the surface. To impart to said surface the power of absorption and an agreeable appearance, the superficial film had to be removed, as by cutting.

The present invention contemplates the production of porous articles, such as artificial spongs, having porous surfaces which are produced directly in the process.

The other objects and the nature of the invention will become apparent from the following description and appended claims.

In accordance with the principles of the instant invention, an intimate mixture of viscose, hemp and pore-forming substance, such as sodium sulphate decahydrate, is preliminarily shaped into the desired form. Prior to coagulation and fixing, bodies hereinafter more fully explained and of appropriate size and shape are incrusted or partially embedded into the surfaces of the shaped mass in any suitable manner. Thereafter, the mass is coagulated and fixed in any of the usual manners. The pore-forming substance is remove from the article by washing with water. Finally, the embedded or incrusted materials are removed. Either prior to or subsequent to the removal of the incrusted bodies, the articles are given the usual finishing treatments.

The bodies which are to be incrusted or embedded on the surfaces of the mass, so that upon removal thereof, as previously explained, the article will have a porous surface, are substances which are substantially inert to and are not appreciably attacked by the reagents employed in the coagulation, fixing and other treatments which the materials have to undergo during the process of producing the articles. These bodies are of sizes and shapes to produce pores of the desired shapes and sizes in the surface of the article. They should also not be too hard or too brittle, since such substances may splinter, and the presence of splinters or hard fragments is not desired in the finished article, especially if the product is a sponge. Satisfactory results have been secured when the incrusting bodies are formed of substantially inert polyhedric bodies or bodies having curved surfaces. Gravel, ground quartz, metal bodies, etc. are several illustrative examples of incrusting bodies which have given satisfactory results.

Various procedures may be used for incrusting or embedding the incrusting bodies. In practice, an intimate mixture of viscose, fibers and pore-forming substances is preliminarily shaped and the incrusting bodies applied to the surfaces of the shaped mass in such a manner that they are in contact, at least during coagulation and fixing, with that portion of the surface to which it is desired to give the desired texture. For example, the preliminarily molded or shaped mass may be inserted into a bed of the incrusting particles and, under action of pressure, the bodies are forced slightly into the plastic mass and give rise to superficial imprints corresponding to their shape. The pressure should be of a magnitude sufficient only to partially and superficially embed the body into the mass. By appropriately manipulating the shaped mass, the incrusting bodies may be incrusted on all the desired surfaces.

The removal of the incrusted bodies may be effected by hand, or mechanically in an apparatus giving impacts to the sponges, so as to cause a dislodgment of the incrusted material which will readily separate subsequently, due to the difference in the specific gravities. The dislodged incrusting bodies may be reused in the process with or without, as the case may be, removal of any adhering material thereof in any convenient manner. The dislodgement of the incrusting bodies causes a slight erosion upon the surface of the article (sponge) and imparts to the latter a downy appearance and an agreeable feel which are highly desirable.

Though in the preferred form of the invention the pore-forming substance is sodium sulphate decahydrate, it is to be understood that various other pore-forming substances may be used. Thus, instead of sodium sulphate decahydrate crystals, other crystals or amorphous substances which melt or dissolve easily may be used. Various substances, such as paraffin, stearin and substances rich in water of crystallization may be used. Generally, alkali metal salts containing water of crystallization and readily fusible are suitable. Thus, sodium acetate trihydrate, sodium carbonate decahydrate, trisodium phosphate dodecahydrate, disodium phosphate dodecahydrate, potassium sodium tartrate tetrahydrate, potassium fluoride dihydrate, and sodium thiosulphate pentahydrate may be used. The crystals or pore-forming substance may be selected as to size and shape as to produce a texture very similar to natural sponges.

In the preferred embodiment, the fibers are hemp. However, in place of hemp, other textile fibers, such as linen, jute, cotton and the like, or mixtures thereof, may be used.

While the preferred embodiment of the invention contemplates the use of viscose, it is understood that other esters, such as nitrate, acetate or cellulose ethers, such as ethyl or benzyl cellulose, may be employed.

In order to more clearly explain the invention, the following illustrative method is set forth.

Example.—20 gr. of hemp are mixed with 400 gr. of viscose comprising 10% of cellulose and with 1200 gr. of crystals of decahydrated sodium sulphate. A predetermined quantity is removed and molded in the form of any desired shape, such as a ball. The latter is inserted into a bed of gravel of an average diameter of 6 mm. and a slight pressure is exerted for incrusting the pebbles in the surface. The viscose of the mass is coagulated and then fixed by treatment with a hot acid or salt solution, or by the application of heat in the presence or absence of steam, or by any other known means for the coagulation of viscose. After thorough washing, the mass is removed from the bed and the incrusted gravel dislodged.

Porous articles, such as sponges, produced in accordance with this invention are formed directly in the process with porous surfaces of an irregular appearance. The surface pores impart to the product the desired degree of absorption. By the use of substantially inert incrusting bodies and the removal and reuse thereof, as herein described, the process is made economical. There is substantially no loss of the incrusting material.

Since it is obvious that various changes and modifications may be made in the above description without departing from the nature or spirit thereof, this invention is not restricted thereto except as set forth in the appended claims.

We claim:

1. In a method of preparing porous articles, such as artificial sponges or the like, the steps which comprise incrusting bodies which are substantially inert to and are not appreciably attacked by the reagents employed in the coagulation, fixing and other treatments the materials have to undergo during the process of producing the articles into the surfaces of a shaped mass formed of an intimate mixture of a cellulose derivative, fibers and pore-forming substance, coagulating and fixing the cellulose derivative, removing the pore-forming substance, and removing the incrusted bodies.

2. In a method of preparing porous articles, such as artificial sponges or the like, the steps which comprise incrusting polyhedric bodies which are substantially inert to and are not appreciably attacked by the reagents employed in the coagulation, fixing and other treatments the materials have to undergo during the process of producing the articles into the surfaces of a shaped mass formed of an intimate mixture of a cellulose derivative, fibers and pore-forming substance, coagulating and fixing the cellulose derivative, removing the pore-forming substance, and removing the incrusted bodies.

3. In a method of preparing porous articles, such as artificial sponges or the like, the steps which comprise incrusting bodies having curved surfaces and which are substantially inert to and are not appreciably attacked by the reagents employed in the coagulation, fixing and other treatments the materials have to undergo during the process of producing the articles into the surfaces of a shaped mass formed of an intimate mixture of a cellulose derivative, fibers and pore-forming substance, coagulating and fixing the cellulose derivative, removing the pore-forming substance, and removing the incrusted bodies.

4. In a method of preparing porous articles, such as artificial sponges or the like, the steps which comprise incrusting gravel into the surfaces of a shaped mass formed of an intimate mixture of a cellulose derivative, fibers and pore-forming substance, coagulating and fixing the cellulose derivative, removing the pore-forming substance, and removing the gravel.

5. In a method of preparing porous articles, such as artificial sponges or the like, the steps which comprise incrusting bodies which are substantially inert to and are not appreciably attacked by the reagents employed in the coagulation, fixing and other treatments the materials have to undergo during the process of producing the articles into the surfaces of a shaped mass formed of an intimate mixture of viscose, fibers and pore-forming substance, coagulating and fixing the viscose, removing the pore-forming substance, and removing the incrusted bodies.

6. In a method of preparing porous articles, such as artificial sponges or the like, the steps which comprise incrusting polyhedric bodies which are substantially inert to and are not appreciably attacked by the reagents employed in the coagulation, fixing and other treatments the materials have to undergo during the process of producing the articles into the surfaces of a shaped mass formed of an intimate mixture of viscose, fibers and pore-forming substance, coagulating and fixing the viscose, removing the pore-forming substance, and removing the incrusted bodies.

7. In a method of preparing porous articles, such as artificial sponges or the like, the steps which comprise incrusting bodies having curved surfaces and which are substantially inert to and are not appreciably attacked by the reagents employed in the coagulation, fixing and other treatments the materials have to undergo during the process of producing the articles into the surfaces of a shaped mass formed of an intimate mixture of viscose, fibers and pore-forming substance, coagulating and fixing the viscose, removing the pore-forming substance, and removing the incrusted bodies.

8. In a method of preparing porous articles, such as artificial sponges or the like, the steps which comprise incrusting gravel into the surfaces of a shaped mass formed of an intimate mixture of viscose, fibers and pore-forming substance, coagulating and fixing the viscose, removing the pore-forming substance, and removing the gravel.

9. A method of preparing porous articles which comprises preliminarily shaping an intimate mixture of viscose, fibers and pore-forming substances, manipulating the preliminarily shaped mass to cause the desired surfaces thereof to contact with incrusting bodies which are substantially inert to and are not appreciably attacked by the reagents employed in the coagulation, fixing and other treatments the materials have to undergo during the process of producing the articles, applying, in conjunction with the said manipulating operation, sufficient pressure to partially and superficially imbed the said incrusting bodies into the surfaces of the shaped mass contacting with the incrusting bodies, coagulating and fixing the thus treated mass, removing the pore-forming material, and dislodging the incrusted bodies by subjecting the mass to impacts.

PIERRE LEFEBVRE-CARNOT.
LEON PIERRE GEORGES VAUTIER.